United States Patent [19]

Sugino

[11] Patent Number: 5,176,932
[45] Date of Patent: Jan. 5, 1993

[54] METHOD OF PRODUCING AN EDIBLE PRODUCT OF FISH MEAT PASTE SIMULATING CRAB LEG MEAT

[75] Inventor: Yoshito Sugino, Sakujimachi, Japan

[73] Assignee: Sugiyo Co., Ltd., Ishikawa, Japan

[21] Appl. No.: 852,332

[22] Filed: Mar. 17, 1992

Related U.S. Application Data

[63] Continuation of Ser. No. 692,715, Apr. 29, 1991, abandoned.

[30] Foreign Application Priority Data

May 1, 1990 [JP] Japan .................................. 2-115544

[51] Int. Cl.⁵ .............................................. A23L 1/33
[52] U.S. Cl. .................................. 426/250; 426/414; 426/513; 426/643; 426/802
[58] Field of Search ............... 426/104, 129, 138, 414, 426/513, 643, 802, 250

[56] References Cited

U.S. PATENT DOCUMENTS

| | | |
|---|---|---|
| 4,704,291 | 11/1987 | Nagasaki ............................. 426/513 |
| 4,751,096 | 6/1988 | Nada et al. ........................... 426/643 |
| 4,824,687 | 4/1989 | Yasuno ................................. 426/643 |
| 4,889,742 | 12/1989 | Sasamoto et al. .................... 426/643 |
| 4,900,570 | 2/1990 | Matsubara . | |

FOREIGN PATENT DOCUMENTS

| | | |
|---|---|---|
| 0362417 | 4/1990 | European Pat. Off. . |
| 60-9469 | 1/1985 | Japan .................................. 426/513 |
| 60-9471 | 1/1985 | Japan .................................. 426/643 |
| 3-43062 | 2/1991 | Japan . |

OTHER PUBLICATIONS

Derwent Publication No. 89-368585 (50), 1989,
JP-A-1277473 (Fushimi Kamaboko K.K.) Apr. 27, 1988.
Patent Abstracts of Japan, vol. 9, No. 247, JP-A-60102171 (Yamasa Kamaboko K.K.) Oct. 3, 1985.
Patent Abstracts of Japan, vol. 12, No. 391, JP-A-63137660 (Fumihiko Masuda) Oct. 18, 1988.

Primary Examiner—Arthur L. Corbin
Attorney, Agent, or Firm—Wegner, Cantor, Mueller & Player

[57] ABSTRACT

A method of producing a product of fish meat paste simulating natural crab leg meat, which comprises: a first step of cutting a pair of stripes of heat-coagulated fish meat paste into two groups of noodle-like strings as each of the stripes is longitudinally conveyed by a conveyor, and putting the strings of each of the two groups together into a continuous, elongated bundle generally rectangular in transverse section; a second step of successively cutting each of the bundles aslant relative to the longitudinal direction thereof as each of the bundles is individually conveyed so as to produce a plurality of block components of generally parallelepipedic shape each having an acute angle in the forward end thereof; a third step of conveying the block components side by side in pairs and putting each pair of block components together into a single block shaped like the nocked end portion of an arrow, with one cut surface of one block component in each pair contacting the opposite cut surface of the other block component; and a fourth step of successively wrapping each of the blocks in a sheet of edible film as they are conveyed.

4 Claims, 2 Drawing Sheets

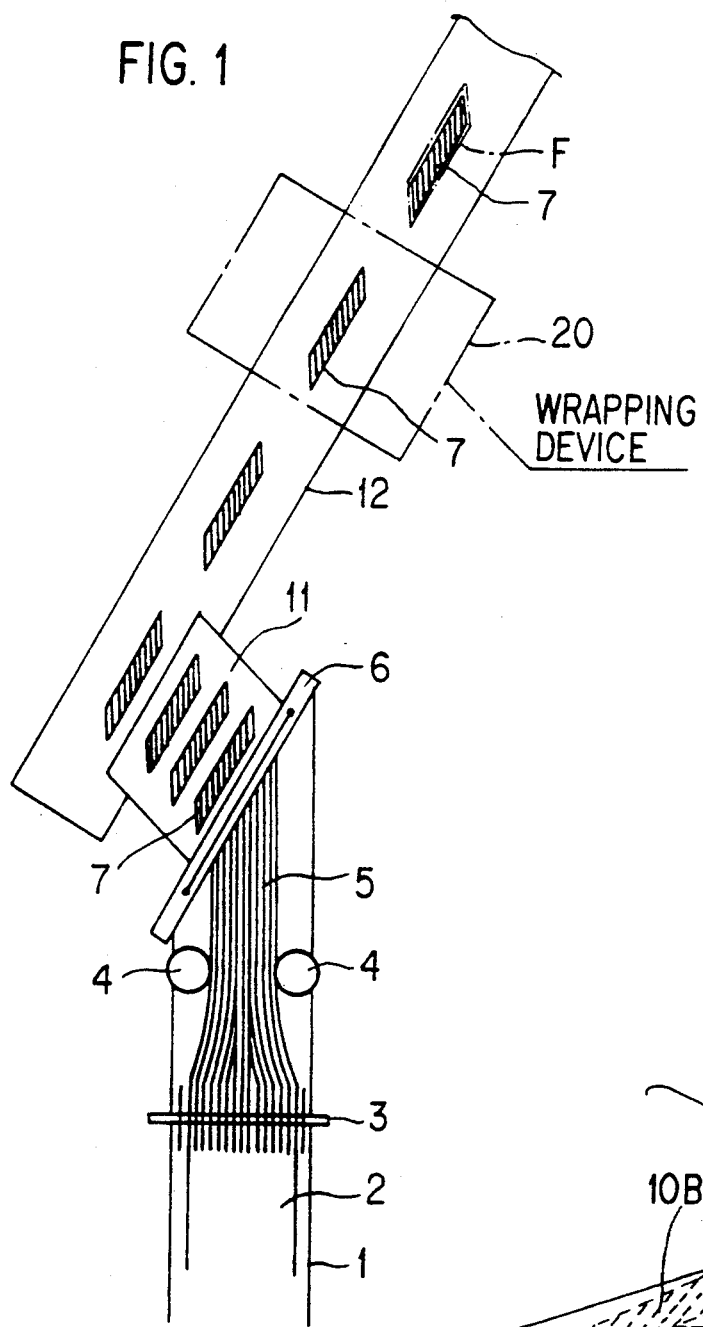
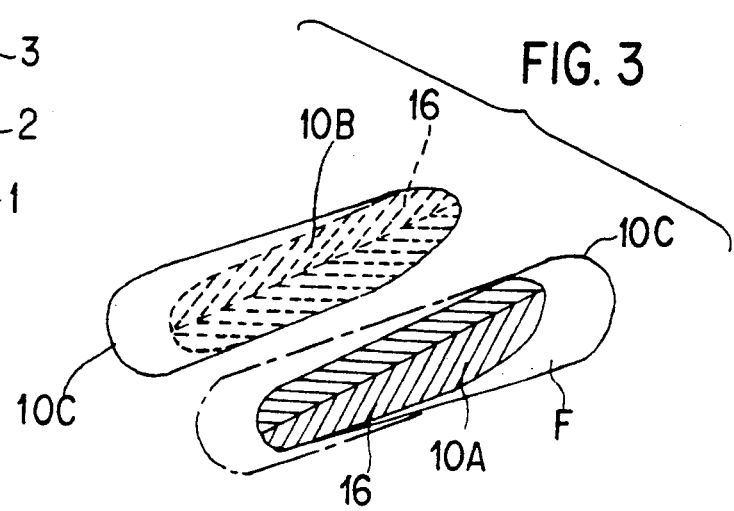

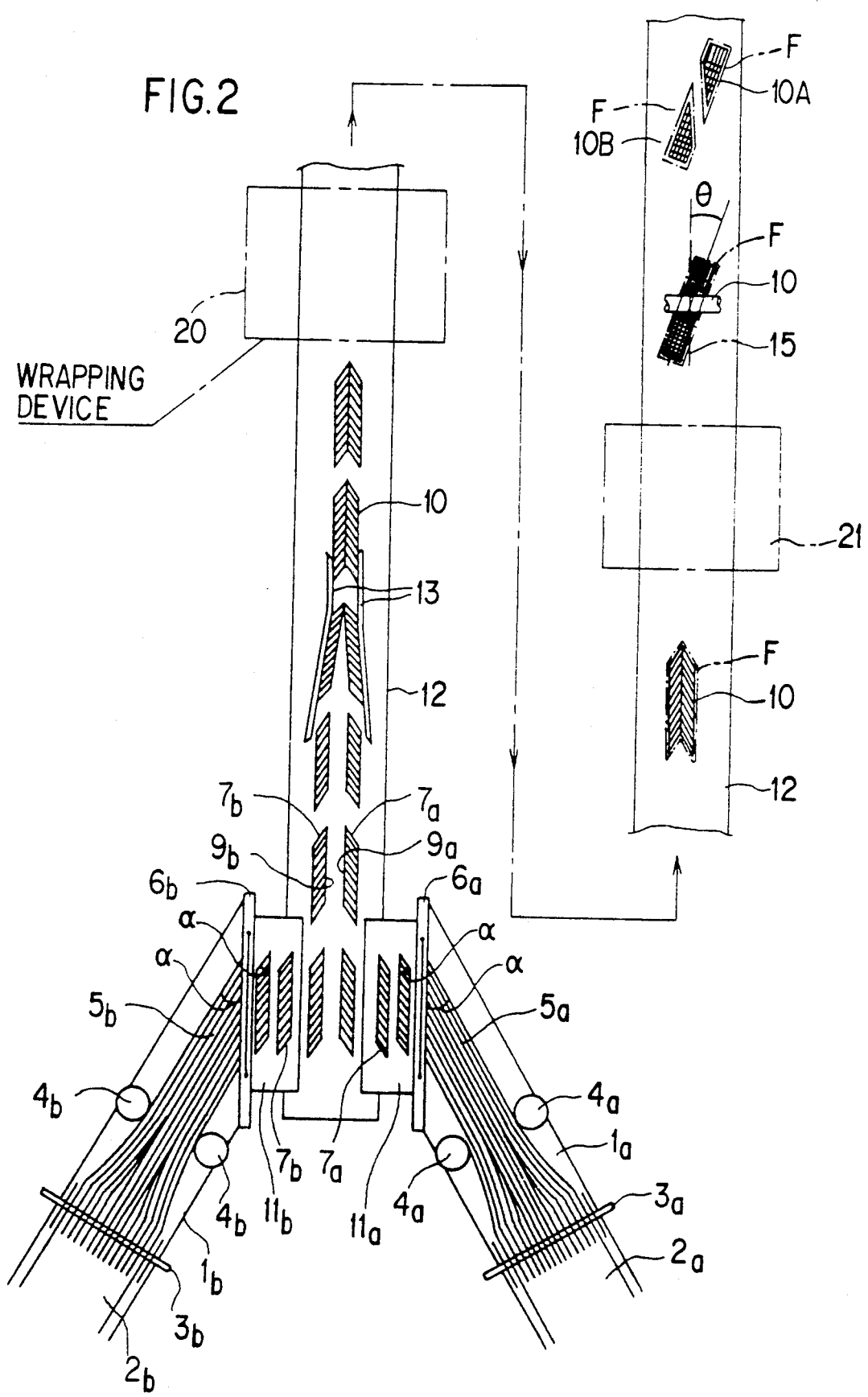

METHOD OF PRODUCING AN EDIBLE PRODUCT OF FISH MEAT PASTE SIMULATING CRAB LEG MEAT

This application is a continuation of U.S. application Ser. No. 07/692,715 filed Apr. 27, 1991, now abandoned.

BACKGROUND OF THE INVENTION

This invention relates to a method of producing an edible product of fish meat paste simulating crab leg meat and the edible product produced by the method. More particularly, this invention relates to a method of producing an improved substitute for crab leg meat which not only gives a particular oral sensation as if real crab leg meat were being eaten but also has an appearance closely resembling real crab leg meat and consequently has a high commercial value.

There are known various methods of making an edible product simulating crab leg meat from fish meat paste, such as those disclosed in Japanese Patent Publication Nos. 14784 through 14789. In these methods, several sheets of coagulated fish meat paste are cut into noodle-like strings, and the cut sheets are piled one upon another so that the strings are put together into a bundle, which is cut aslant into a plurality of blocks containing short fibers of coagulated fish meat paste, which resemble those of real crab leg meat. The methods include a troublesome step of piling up the sheets of coagulated fish meat paste that have been cut into noodle-like strings, and the devices for carrying out the methods are much complicated.

In Japanese Patent Application No. 1-178230, the present inventor has proposed a method of producing a product of fish meat paste simulating crab leg meat. In this method, as two stripes of heat-coagulated fish meat paste are conveyed longitudinally on a conveyor belt, they are cut into a plurality of noodle-like strings, which are put together into a pair of bundles, each of which is cut aslant and symmetrically with the other bundle into a plurality of block components, which are put together in pairs with the opposite cut surfaces of each pair of block components contacting each other, so that a plurality of blocks each looking like the nocked end of an arrow are formed. The blocks are then combined longitudinally into an elongated body, which is again cut into pieces of a desired length. It is difficult, however, to combine the individual blocks into a single elongated body, and it takes a long time to combine the blocks and then cut the combined blocks into pieces of a desired length.

It is therefore one object of the invention to provide a method of producing an edible product of fish meat paste which not only gives a particular oral sensation as if real crab leg meat were eaten but also has an appearance more closely resembling real crab leg meat than the various substitutes for crab meat known in the prior art.

It is another object of the invention to provide such a method as mentioned above which can be carried out in a simpler and more efficient manner than the known methods of producing similar products simulating crab leg meat.

SUMMARY OF THE INVENTION

The invention provides a first method of producing a product of fish meat paste simulating natural crab leg meat, which comprises:
a first step of cutting a stripe of heat-coagulated fish meat paste into a plurality of noodle-like strings as the stripe is longitudinally conveyed by a conveyor, and putting the strings together into a continuous, elongated bundle generally rectangular in transverse section;
a second step of successively cutting the bundle aslant relative to the longitudinal direction thereof as the bundle is conveyed so as to obtain a plurality of blocks of generally parallelepipedic shape;
a third step of successively conveying the generally parallelepipedic blocks separated from each other; and
a fourth step of wrapping each of the blocks in a sheet of edible film as the blocks are conveyed.

The invention provides a second method of producing a product of fish meat paste simulating natural crab leg meat, which comprises:
a first step of cutting a pair of stripes of heat-coagulated fish meat paste into two groups of noodle-like strings as each of the stripes is longitudinally conveyed by a conveyor, and putting the strings of each of the two groups together into a continuous, elongated bundle generally rectangular in transverse section;
a second step of successively cutting each of the bundles aslant relative to the longitudinal direction thereof as each of the bundles is individually conveyed so as to produce a plurality of block components of generally parallelepipedic shape each having an acute angle in the forward end thereof;
a third step of conveying the block components side by side in pairs and putting each pair of block components together into a single block shaped like the nocked end portion of an arrow, with one cut surface of one block component in each pair contacting the opposite cut surface of the other block component; and
a fourth step of successively wrapping each of the blocks in a sheet of edible film as they are conveyed.

The invention provides a third method of producing a product of fish meat paste simulating natural crab leg meat, which comprises the first, second, third and fourth steps of the above-mentioned second method, and additionally a fifth step of successively turning over each of the wrapped blocks prepared in the first to fourth steps so that the blocks lie on their side on the conveyor and, as they are conveyed, successively cutting each of the blocks into two halves at a small angle relative to the longitudinal direction thereof.

The coagulated fish meat paste used in the invention is prepared by mixing kneaded fish meat called "surimi" in Japanese, seasonings and other additives with water, kneading the mixture, forming the kneaded mass into a sheet, and coagulating the sheet by heating. Either the block or the edible wrapping film or both are so colored that the block wrapped in the film appears like real crab leg meat.

In the final product produced by the third method, the bundled strings are exposed in the cut surface of the wrapped block as if they were muscle fibers of crab leg meat, so that the product resembles crab leg meat more closely than otherwise.

BRIEF DESCRIPTION OF THE DRAWINGS

The invention will now be described in further detail with reference to the accompanying drawing, wherein:

FIG. 1 is a schematic top plan view of an apparatus for carrying out the first method of the invention;

FIG. 2 is a schematic top plan view of an apparatus for carrying out the second and third methods of the invention;

FIG. 3 is a schematic perspective view of a final product produced by the third method of the invention.

PREFERRED EMBODIMENTS OF THE INVENTION

Referring now to FIG. 1, the first method will be described in detail. In the first step, as a single stripe 2 of heat-coagulated fish meat paste is longitudinally conveyed on a first conveyor 1, the stripe is cut by a slitter 3 into a plurality of noodle-like strings or threads, which are put together by means of a pair of guide rollers 4 into a bundle 5 generally square in transverse section.

In the second step, as the bundle 5 is conveyed longitudinally, it is successively cut by a cutter 6 aslant relative to the length of the bundle into a plurality of blocks 7 of generally parallelepipedic shape. Each of the noodle-like strings formed into the bundle 5 has a surface sufficiently adhesive to each other, so that even when the bundle is cut into blocks, the strings are not separated but kept as an integral body.

In the third step, the blocks 7 are separated as they are conveyed by a second conveyor 11 which runs aslant relative to the running direction of the first conveyor 1, and then transferred onto a third conveyor 12, on which the blocks 7 lie in a row and spaced a suitable distance from each other.

In the fourth step, the blocks 7 are individually and successively wrapped in a sheet of edible film F as they pass through a known suitable wrapping device schematically shown merely as a block 20. Either the wrapping film or each of the blocks or both are colored red so as to make the final product simulate real crab leg meat in appearance.

In the second method of the invention shown in FIG. 2, a pair of stripes of heat-coagulated fish meat paste 2a and 2b are used as a starting material. As the stripes 2a and 2b are conveyed on a pair of conveyors 1a and 1b arranged so as to form an inverted V in top plan view, the stripes are cut by a pair of slitters 3a and 3b into two groups of noodle-like strings or threads, which are put together by two pairs of guide rollers 4a and 4b into two continuous, elongated bundles 5a and 5b generally rectangular in transverse section. In the second step, as the bundles 5a and 5b are conveyed longitudinally, a pair of cutters 6a and 6b each having a blade extending aslant relative to the running direction of each of the conveyors 1a and 1b successivley cut the bundles 5a and 5b, respectively, aslant relative to the directions in which they are conveyed, so that two groups of block components 7a and 7b are produced. Each of the block components 7a and 7b is of generally parallelepipedic shape and has a front end making an acute angle $\alpha$ with the longitudinal direction of the block component.

In the third step, the block components 7a and 7b cut by the two cutters 6a and 6b, respectively, are conveyed by a pair of lateral conveyors 11a and 11b running sideways toward each other and transferred onto a central conveyor 12 arranged between the two lateral conveyors 11a and 11b so as to run perpendicularly to the running direction of the lateral conveyors 11a and 11b, so that on the central conveyor 12 the block components 7a and 7b are arranged side by side in pairs, with the opposite cut surfaces 9a and 9b of each pair of block components facing each other. The lateral conveyors 11a and 11b and the central conveyor 12 are so constructed and arranged that the block components 7a and 7b can be transformed smoothly from the lateral conveyors 11a and 11b onto the central conveyor 12 without being turned sideways or upside down. As the central conveyor 12 advances, a pair of narrowing guide rails 13 put each paired block components 7a and 7b together into a single block 10 with the opposite cut surfaces 9a and 9b of the paired block components contacting each other. The blocks 10 thus formed look like the nocked end of an arrow.

In the fourth step, the blocks 10 are individually wrapped in a sheet of edible film F by a wrapping device schematically shown at 20. In a copending application, the same inventor has proposed a method of wrapping a core material in a sheet of edible membrane. This method can also be used in the present invention for wrapping the block 7 or 10. The method of the copending U.S. application is incorporated herein by reference. Either the film or the block or both are colored so as to resemble natural crab leg meat. Actually, the wrapped block 10 has its ends rounded by the wrapping film F as at 10C in FIG. 3.

When the bundle 5 (5a, 5b) of strings is cut into a block component 7 (7a 7b), if the length of the short strings included in the block component is set to 1 cm to 2.5 cm, the final product gives an oral sensation quite similar to that experienced when natural crab claw meat is eaten. If the length is set to 2.5 cm to 5 cm, the final product gives an oral sensation similar to that experienced when natural crab leg meat is eaten. The angle $\alpha$ at which the bundle of strings is cut into block components and the length of the cut strings may vary and never limit the scope of the invention in any way.

The third method of the invention is intended to produce a product having an increased area in which a pattern closely resembling that of the muscle fibers of natural crab leg meat is exposed thereby to increase the commercial value of the product.

The third method comprises the first to fourth steps of the previously described second method and additionally a fifth step in which the wrapped blocks 10 prepared by the first to fourth steps are successively turned sideways on the central conveyor 12 by means of a suitable device schematically shown at 21 so as to lie on their side and slightly aslant, that is, making an acute angle $\theta$ with the runing direction of the conveyor 12, and as the blocks 10 are conveyed, each of the blocks lying on its side is cut generally diagonally into two halves 10A and 10B by a rotary cutter having a cutting blade 15 arranged along the running direction of the conveyor 12. Each of the two halves 10A and 10B obtained from a single block 10 has a cut surface 16 in which the component short strings of fish meat paste are exposed in a pattern closely resembling the muscle fibers of real crab leg meat, as shown in FIG. 3.

In FIG. 2 the wrapped block 10 lies on its side and slightly aslant relative to the running direction of the conveyor 12. The block 10 may lie on its side not aslant but in the same direction as the running direction of the conveyor 12, with the cutter blade 15 set aslant relative to the running direction of the conveyor 12.

In FIG. 2, the blocks 10 are cut diagonally. The cutting angle θ is preferably such that the length of the cut surface 16 is 50 to 100% of that of the whole block 10 since the angular range gives the product a good appearance quite similar to natural crab leg meat.

As explained above in detail, the invention has successfully provided a product of fish meat paste simulating natural crab leg meat in which a pattern similar to the particular muscular pattern of crab leg meat appears in a cut surface of the product thereby to give the product a good appearance.

In accordance with the first method of the invention, it is possible to obtain a substitute for natural crab leg meat in a very simple form and at a low cost by cutting a stripe of heat-coagulated fish meat paste into noodle-like strings, putting the strings together into a continuous bundle, successively cutting the bundles aslant to produce blocks made of fiber-like strings of fish meat paste, and wrapping each of the blocks in a sheet of edible film.

In accordance with the second method of the invention, it is possible to produce a substitute for natural crab leg meat efficiently in a series of steps by cutting two stripes of heat-coagulated fish meat paste into noodle-like strings as the stripes are conveyed, putting the strings together into a pair of continuous bundles, cutting each of the bundles aslant to produce block components made of fiber-like strings of fish meat paste, putting each pair of block components together into a single block like the nocked end of an arrow, and wrapping each block in a sheet of edible film.

In accordance with the third method of the invention, it is possible to obtain a substitute for real crab leg meat successively and efficiently by cutting into two halves each of the wrapped blocks obtained by the second method of the invention aslant at a small angle as viewed in side elevation, thereby exposing the bundled strings in the cut surface of each of the two halves of the block as if they were muscular tissues of crab leg meat, so that the final product resembles real crab leg meat more closely than otherwise.

What I claim is:

1. A method of producing a product of fish meat paste simulating natural crab leg meat, which comprises:
    a first step of cutting a pair of stripes of heat-coagulated fish meat paste into two groups of noodle-like strings as each of said stripes is longitudinally conveyed by a conveyor, and putting said strings of each of said groups together into a continuous, elongated bundle generally rectangular in transverse section;
    a second step of successively cutting each of said bundles aslant relative to the longitudinal direction thereof as each of said bundles is individually conveyed so as to produce a plurality of block components of generally parallelepipedic shape, each having an acute angle in the forward end thereof;
    a third step of conveying said block components side by side in pairs and putting each pair of block components together into a single block shaped like the nocked end portion of an arrow, wherein in each block, a cut surface of a first block component contacts the opposite cut surface of a second block component such that the cut noodle-like strings of the first block component lie aslant with respect to its cut surface contacting the second block component in a first direction and the cut noodle-like strings of the second block component lie aslant with respect to its cut surface contacting the first block component in a second direction different from said first direction; and
    a fourth step of successively wrapping each of said blocks in a sheet of edible film as they are conveyed.

2. The method of claim 1, wherein said sheet of edible film is colored so that said wrapped blocks appear like natural crab leg meat.

3. The method of claim 1, further comprising a fifth step of successively turning sideways each of said wrapped blocks prepared in said first to fourth steps so that said wrapped blocks lie on their side on said conveyor and, as they are conveyed, successively cutting each of said blocks into two halves at a small angle relative to the longitudinal direction thereof.

4. The method of claim 3, wherein said sheet of edible film is colored so that said wrapped blocks appear like natural crab leg meat.

* * * * *